Figure 1:
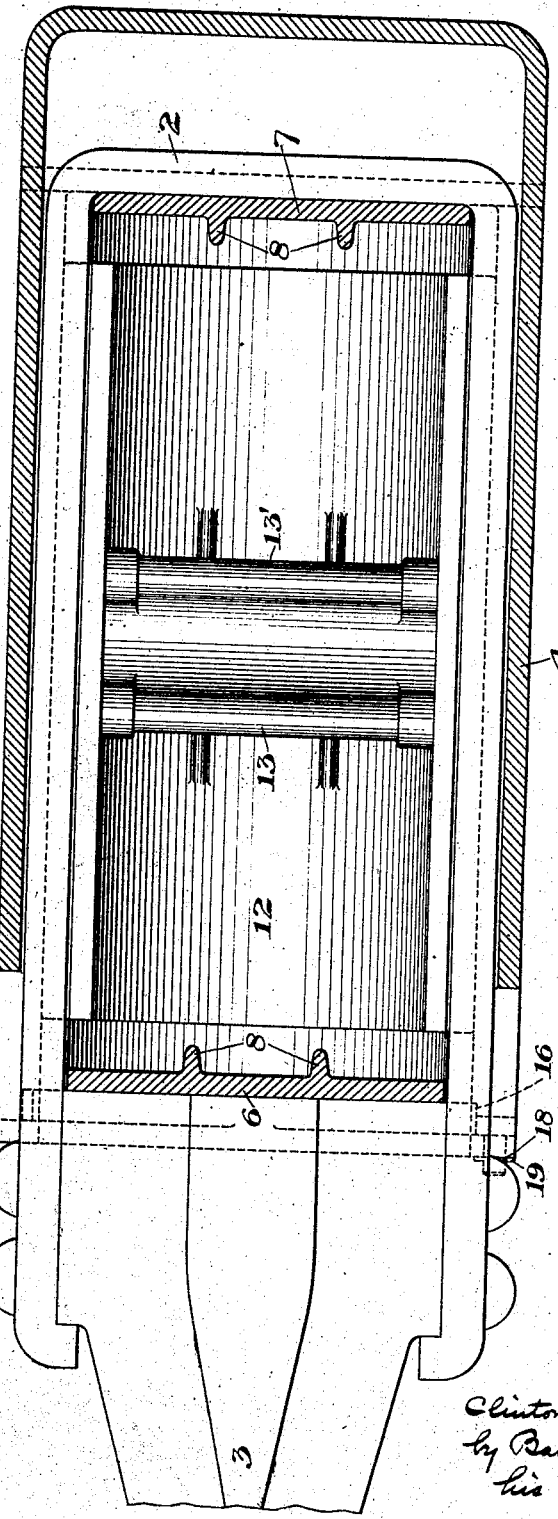

No. 815,050. PATENTED MAR. 13, 1906.
C. A. TOWER.
DRAFT RIGGING.
APPLICATION FILED APR. 6, 1905. RENEWED JAN. 2, 1906.

3 SHEETS—SHEET 1.

WITNESSES
Warren W. Swartz
P. A. Balderson

INVENTOR
Clinton A. Tower
by Bakewell Byrnes
his Attorneys

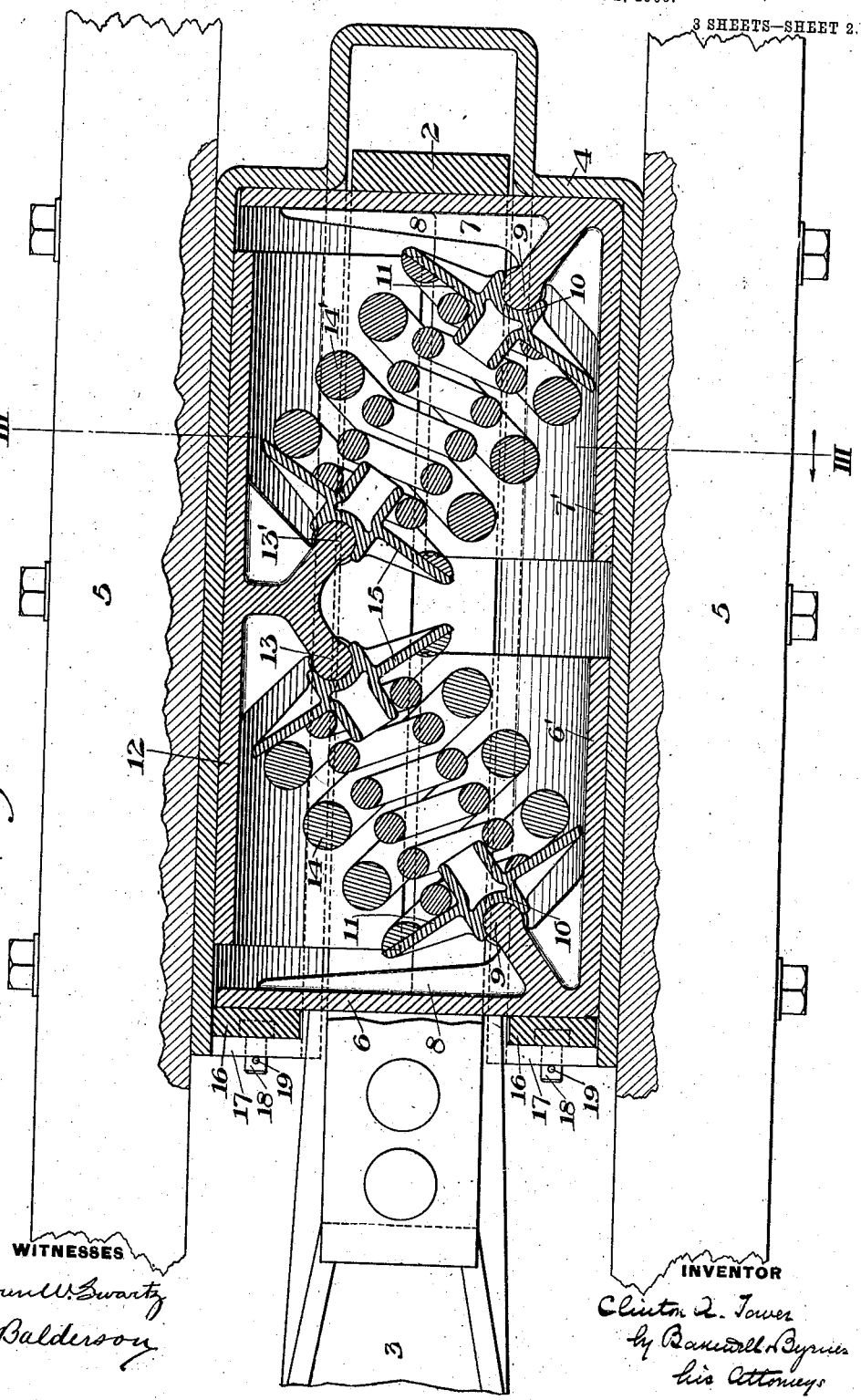

No. 815,050. PATENTED MAR. 13, 1906.
C. A. TOWER.
DRAFT RIGGING.
APPLICATION FILED APR. 6, 1905. RENEWED JAN. 2, 1906.
3 SHEETS—SHEET 3.
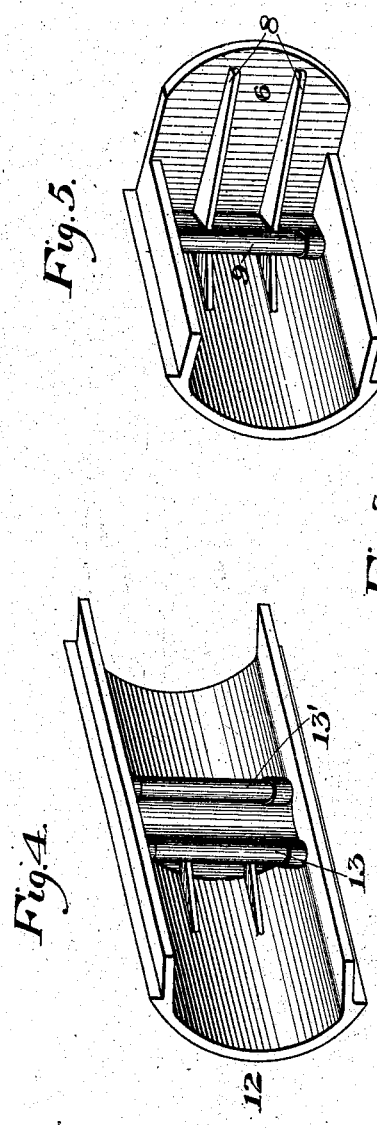
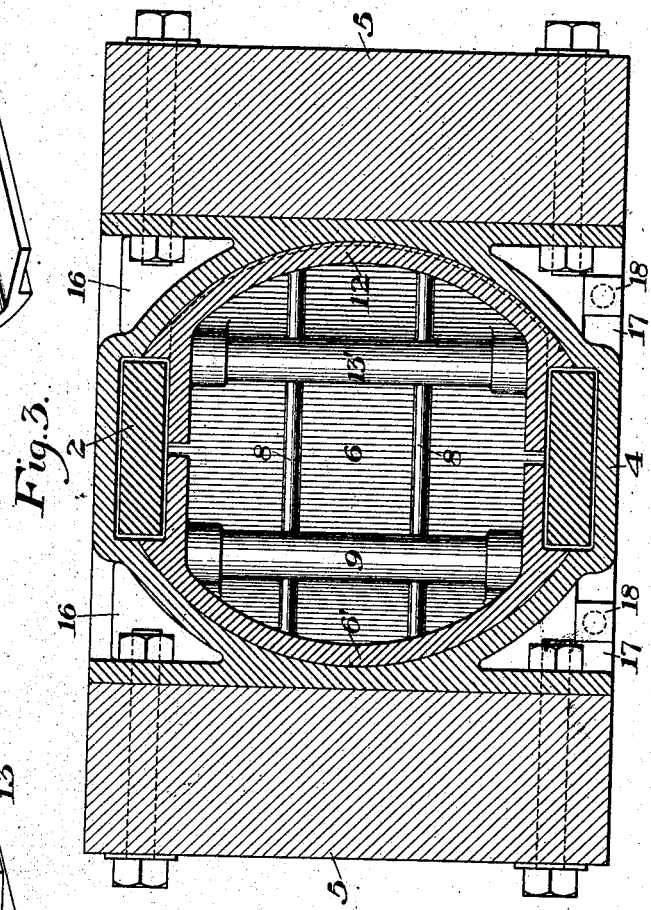
WITNESSES
INVENTOR

UNITED STATES PATENT OFFICE.

CLINTON A. TOWER, OF CLEVELAND, OHIO, ASSIGNOR TO THE NATIONAL MALLEABLE CASTINGS COMPANY, OF CLEVELAND, OHIO, A CORPORATION OF OHIO.

DRAFT-RIGGING.

No. 815,050.  Specification of Letters Patent.  Patented March 13, 1906.

Application filed April 6, 1905. Renewed January 2, 1906. Serial No. 294,188.

*To all whom it may concern:*

Be it known that I, CLINTON A. TOWER, of Cleveland, Cuyahoga county, Ohio, have invented a new and useful Draft-Rigging, of which the following is a full, clear, and exact description, reference being had to the accompanying drawings, forming part of this specification, in which—

Figure 1 is a longitudinal section, partly in elevation, of my improved friction draft-rigging, the springs being omitted. Fig. 2 is a horizontal section in which the springs are illustrated. Fig. 3 is a vertical cross-section on the irregular line III III of Fig. 2, the springs being omitted; and Figs. 4 and 5 are perspective views of the friction elements.

My invention relates to an improvement on the draft-rigging for which I have already filed an application for Letters Patent, Serial No. 244,886, filed February 9, 1905.

My invention provides a friction draft-rigging which is of simple construction, and is comparatively cheap in its first cost, and obviates the many difficulties due to the necessity for frequent repairing which are incident to other forms of friction draft-rigging. It is compact and will fit in the place now required for ordinary spring draft-riggings. It is well understood that friction draft-riggings must be simple and durable, for the work which is put upon them in service is of a very severe character, and if they are easily broken or put out of repair their desirability and usefulness are much lessened.

My invention contemplates the use of frictional devices which are operated by the motion of the draw-bar and are used in conjunction with spring mechanism which is inclined to the line of draft, so that wedges and similar devices which complicate the apparatus and impair its efficiency can be dispensed with.

The principle of my invention may be applied in many ways; but I deem the forms shown in the drawings to be desirable.

In the drawings, 2 represents the yoke, which extends from the rear end of the draw-bar shank 3 and may be of any suitable construction, for the means of connection between the draw-bar and the elements of my friction device do not constitute a limiting feature of the invention.

4 is a case in which the parts of my apparatus are contained, and which is preferably a strong casting of box form set between the draft-timbers 5 5 or otherwise suitably secured to the framing of the car. Fitting in this case are the friction elements, consisting, preferably, of opposite followers 6 7, which, as shown in the figures on the first and second sheets of the drawings, are of general L shape, their side portions 6' 7' being of circular outline to conform to the shape of the case 4, which is also curved on its interior, and the end portions 6 7, which are preferably integral with the side portions, being flat and provided, preferably, with strengthening ribs or flanges 8. At or near one of the corners of each follower is a shoulder 9, preferably of knuckle form and adapted to receive a correspondingly-shaped socket 10 of a spring-plate 11, and on the side of the case opposite to these shoulders is a friction-plate 12, which is fitted against the side of the case and has projecting from it shoulders 13 13', which are directed toward the shoulders 9 and are preferably of knuckle form. Springs 14 14', which are at an angle to the line of draft as well when they are in their normal state as also when under compression, extend between the shoulders 13 13' and the shoulders 9, and bear at one end upon the spring-plates 11 on the shoulders 9 and at the other end upon spring-plates 15 on the shoulders 13 13'.

For the purpose of holding the followers and the springs removably in the case I employ keys 16, which are adapted to be set vertically within sockets at the forward end of the case and bear against shoulders 17, being held, preferably, by bolts 18, having cotters 19 at their lower ends. When the keys are in place, they block the end follower 6; but when the keys are removed, as can be done by first detaching the cotters and bolts, the entire rigging comprising the draw-bar, yoke-followers, and springs can be drawn endwise from the case.

When the parts are in the position shown in Fig. 2, if a buffing thrust is applied to the draw-bar the end of the latter bearing against the front follower 6 forces it inwardly, the rear follower being held in place by abutting against the back end of the case. The inward motion of the follower 6, acting upon the forward spring 14, compresses it, causing it to force the follower 6 against one side of the case and the friction-plate 12 against the other side of the case, bringing them into intimate frictional contact with the case and causing them to move somewhat rearwardly, with the result of imparting a compression to the spring 14'. The greater the extent of motion of the front follower the greater will be the compression of the springs 14 14' and the greater the force with which the followers and the friction-plate 12 are pressed frictionally against the side of the case. Such frictional engagement is increased by the movement of the springs to a position more nearly at right angles to the line of draft as the follower 6 moves rearwardly. The device therefore opposes the required yielding and frictional resistance to buffing motion of the draw-bar. When the buffing force is released, the springs advance the friction-plate 12 and move the front follower 6 into position against the keys 16, and if a pulling force is now exerted upon the draw-bar the yoke 2, acting upon the rear follower 7, will draw it forwardly, thus compressing the spring 14', moving the friction-plate 12 forwardly and compressing the spring 14. The compression of the springs 14 and 14' will force the follower 7 and friction-plate 12 laterally against the case and will exert the required frictional resistance to the forward motion of the draw-bar.

It will be understood by those skilled in the art that the device may be modified in many ways. For example, the interior of the case may be made rectangular or of V shape in cross-section instead of being curved, and the followers may then be provided with appropriately-shaped sides to fit the interior of the case. The case may also be corrugated longitudinally or formed with V-shaped grooves to increase the contact-surface and the amount of friction. The device may also be combined with other forms of frictional and spring devices, as described in my previous application, Serial No. 244,886. The various parts may also be modified in form and arrangement.

I claim—

1. A frictional draft-rigging having friction elements and a plurality of springs inclined to the line of draft when not under buffing or pulling strains and also when under such strains; substantially as described.

2. A frictional draft-rigging comprising friction elements, and interposed springs which extend in opposite directions and at an angle to the line of draft; substantially as described.

3. A frictional draft-rigging comprising friction elements set between lateral confining-surfaces, and interposed springs which extend in opposite directions and at an angle to the line of draft; substantially as described.

4. A frictional draft-rigging comprising a case, opposite friction-followers, a friction-plate or member, and springs extending from the followers to the friction-plate or member and inclined to the line of draft; substantially as described.

5. A frictional draft-rigging comprising a case, opposite friction-followers, a friction-plate or member, and springs extending in opposite directions from the followers to the friction-plate or member and inclined to the line of draft; substantially as described.

6. A frictional draft-rigging comprising a case, opposite followers of L shape, a friction-plate or member, and spring mechanism extending from the friction-plate or member to the corner portions of the followers; substantially as described.

7. A frictional draft-rigging comprising a case, opposite followers of L shape, a friction-plate or member, and spring mechanism extending from the middle portion of the friction-plate or member to the corner portions of the followers; substantially as described.

In testimony whereof I have hereunto set my hand.

CLINTON A. TOWER.

Witnesses:
HENRY F. POPE,
HARRY E. ORR.